United States Patent [19]

Menzies

[11] 4,286,707

[45] Sep. 1, 1981

[54] DEVICE FOR DRIVING AN ENDLESS CHAIN

[75] Inventor: James D. Menzies, Carlisle, England

[73] Assignee: Simonacco Limited, Carlisle, England

[21] Appl. No.: 74,537

[22] Filed: Sep. 11, 1979

[51] Int. Cl.$^3$ .................. B65G 23/38; B65G 25/04
[52] U.S. Cl. .................. 198/859; 74/129; 104/162; 226/165
[58] Field of Search .................. 198/858–859, 198/712; 226/165, 166, 151; 74/129, 161; 104/162

[56] References Cited

U.S. PATENT DOCUMENTS

| 1,058,776 | 4/1913 | Mickel | 198/712 X |
| 2,186,061 | 1/1940 | Berg et al. | 226/165 X |
| 3,455,176 | 7/1969 | Dunn et al. | 74/129 |
| 4,059,213 | 11/1977 | Toomay | 226/165 |

Primary Examiner—Robert B. Reeves
Assistant Examiner—Douglas D. Watts
Attorney, Agent, or Firm—Norris & Bateman

[57] ABSTRACT

A device for driving an endless chain or the like, particularly, though not exclusively, a chain of the flat-link kind used in bucket elevators, the device comprising a reciprocating slipper having locking means which grips the chain in one direction of reciprocating movement but runs freely with respect to the chain in the reverse direction, there being means for preventing reverse movement of the chain whereby the slipper advances the chain intermittently in one direction. In an alternative embodiment, two slippers may be provided working in opposition to each other so that the chain may be continuously driven thereby.

7 Claims, 4 Drawing Figures

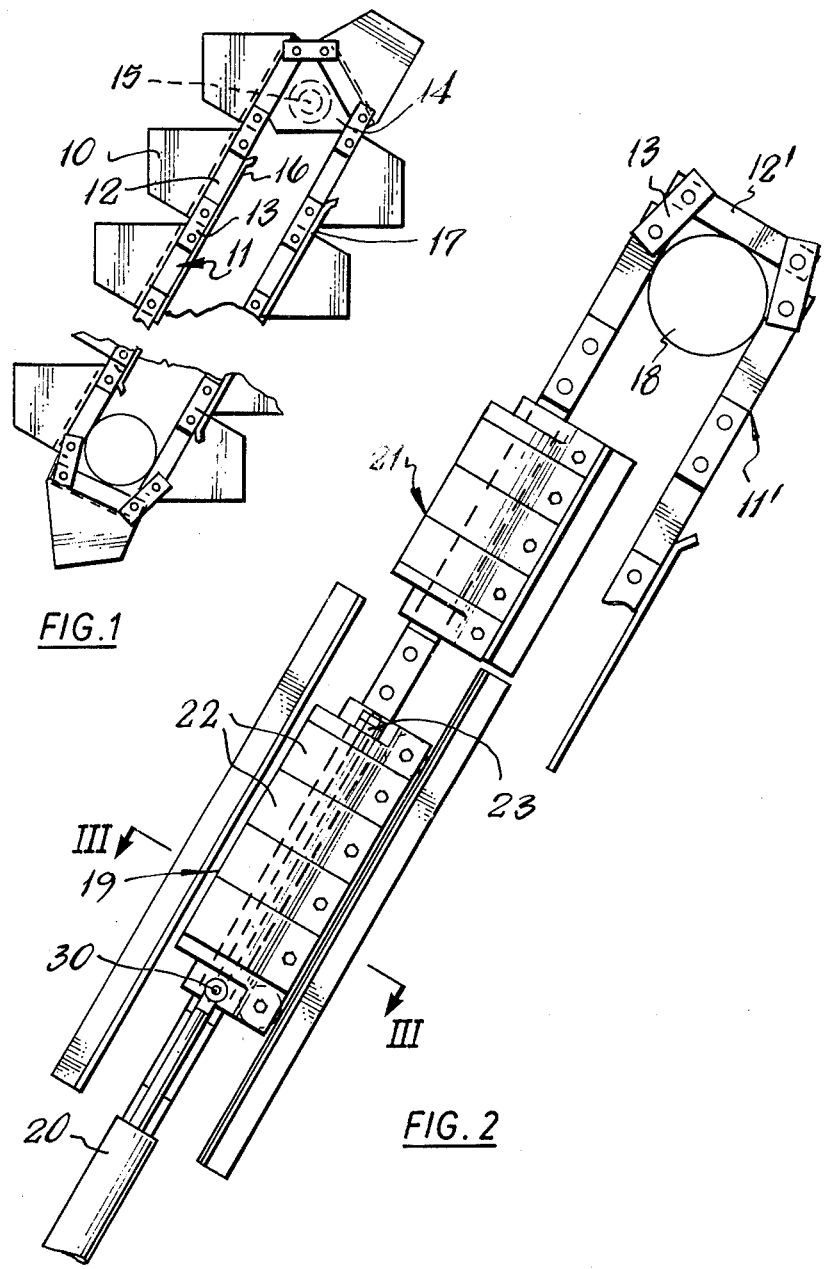

DEVICE FOR DRIVING AN ENDLESS CHAIN

This invention concerns a device for driving an endless chain, particularly though not exclusively a chain of the flat-link kind used in bucket elevators and the like.

Flat-link chains in their simplest form are constructed from lengths of flat bar drilled at each end to receive a link pin. These are assembled into a chain by alternating single links with pairs of parallel links such that each end of each single link is pivotally interposed between the adjacent ends of a pair of parallel links. Flat-link chains of this kind are often caused to slide along skid bars in both runs of the chain, and are usually driven by means of tumblers having flat faces for engaging the flat links at the end of one run of the chain, usually the downstream end of the run in which the chain is used to do some work.

In the case of a bucket elevator, therefore, the tumbler or tumblers are provided at the top of the elevator with the result that the driving force is applied to the chain in the region where the links are undergoing a change of direction thus subjecting the pivot pins and the links to considerable forces which induce rapid wear of the moving parts.

An object of the present invention is to provide a device for driving an endless chain wherein the driving forces are applied in a manner which reduces wear.

According to the present invention there is provided, in combination, an endless chain or the like; a device for driving the same, comprising means movable parallel to the chain in a reciprocating manner, drive means for said movable means, and said movable means including one or more members adapted to grip and thus drive the chain in one direction of movement of said movable means and to permit free movement of the latter relative to the chain in the opposite direction; and means for preventing reverse movement of the chain, whereby said chain may be advanced intermittently in one direction.

An embodiment of the invention will now be described, by way of example only, with reference to the accompanying drawings in which:

FIG. 1 is a side elevation of a bucket elevator operated by conventional drive means;

FIG. 2 is a side elevation of a bucket elevator driven by means incorporating the invention, the buckets having been omitted in the interest of clarity;

Figure 3:
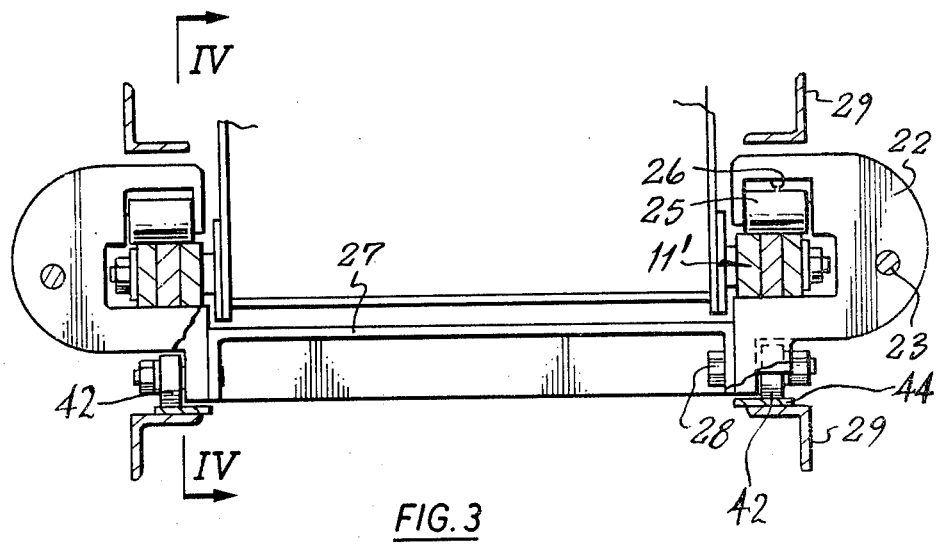
FIG. 3 is a section taken on line III—III of FIG. 2.

Referring now to FIG. 1 a bucket elevator is shown comprising a plurality of buckets 10 mounted between a pair of flat-link chains one of which is generally indicated at 11. Each chain comprises a number of single flat-links 12 which alternate with pairs of parallel links 13, the links 12 and 13 being pivotally interconnected end-to-end. The buckets 10 are pivotally connected to the chain 11 at positions which coincide with the pivots of the links 12 and 13.

In this conventional arrangement, for each chain a flat faced tumbler 14 keyed to a driven shaft 15 serves to drive the chain 11 by positive engagement of the flats with the links 12 and 13.

The upper and lower runs of the chain 11 are supported on skid bars 16 and 17.

Figure 4:
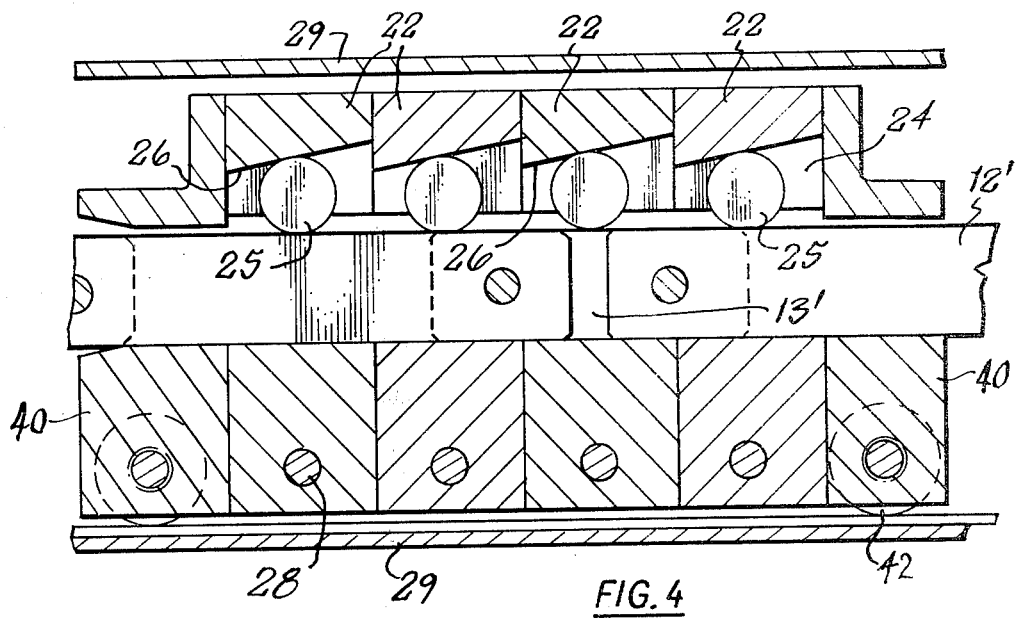
FIG. 4 is a section taken on line IV—IV of FIG. 3.

Referring now to FIGS. 2 to 4, and in accordance with the invention, a pair of parallel chains one of which is indicated at 11 are provided and each is comprised by alternate single and double flat-links 12' and 13'. In this arrangement, a plain idler roller 18 replaces the tumbler 14 of FIG. 1. Thus as shown in FIG. 2 each chain 11' has oppositely linearly movable flights extending with respect to upper support roller 18.

The chains are driven by a slipper generally indicated at 19 to be described in detail, which is driven in a reciprocating manner by one or more linear thrust units 20 connected thereto. A fixed slipper generally indicated at 21 is also provided whose purpose, as will be described, is to permit the chains to move only in one direction.

As can be seen from FIGS. 3 and 4, the slipper 19 comprises a plurality of individual sections 22 bounded by end members 40 each having a roller 42 which runs on a wear strip 44. The sections 22 and members 40 are clamped together by means of bolts 23 (see also FIG. 2) so that each group of sections 22 partially wraps a length of chain as indicated in FIG. 3. Each section 22 includes a recess or chamber 24 which houses a roller 25. One wall of the chamber 24 forms a tapering ramp surface 26. Thus it can be seen that the slipper is free to move to the left in FIG. 4 relative to the chain, whilst movement to the right causes the rollers 25 to become locked between the ramp surfaces 26 and the chain itself. In this way, the slipper and the chain become locked together to that the chain may be driven to the right by the slipper.

As shown in FIG. 3, the slipper 19 is comprised by two groups of sections 22, one on each side of the elevator, and the two series are joined together by a cross member 27 passing below the buckets and flanged and bolted to the sections at 28.

The fixed slipper 21 is of similar construction to the slipper 19 but is fixed relative to the elevator frame so that the chain may be moved through the slipper in the upwards direction in FIG. 2 whilst downwards movement is prevented by the locking action of the rollers.

A pair of guide rails 29 is provided above and below the slipper 19 to prevent excessive free movement of the slipper and the chain, the lower pair of rails supporting the wear strips 44 on which run the rollers 42.

The thrust units 20 are connected to the slipper 19 by means of a connecting eye 30 at the end of each bolt 23. If preferred, however, a single thrust unit can be provided and attached to one of the bolts 23, or to the member 27 below the buckets.

In operation of the device, reciprocating movement of the slipper 19 serves to drive the chain intermittently in one direction whilst the slipper 21 prevents reverse movement of the chain during reverse movement of the slipper 19.

It will be appreciated that the number of sections required in the slipper 21 will be less than those required in the driving slipper 19 as a greater gripping force is required to drive the chain than is required merely to maintain it in a stationary mode.

If required, the fixed slipper 21 can be replaced by one or more further driving slippers, the reciprocating movement of the plurality of slippers being out of phase thus to provide a continuous drive to the chain.

It will be seen from FIG. 4 that the presence of the chain retains the rollers 25 within the chambers 24. However, it may become necessary to repair or renew parts of the chain after a period of use, and if required, the rollers 25 can be provided with pins located in slots in the walls of the chambers so that the rollers remain in the chambers when the chain is removed from the slipper.

It will be appreciated that the drive means described herein is arranged to grip and drive the chain in a straight section thereof where the least possible wear on the pivots and links occurs.

The device has been described in relation to a bucket elevator where the run of the chain and skid bars are disposed in an inclined attitude. The rollers 25 are therefore caused to lock the chain under the action of gravity. However, if the device is used to drive a chain whose links are horizontal or inclined downwardly then the rollers may need to be spring-loaded towards the reducing taper of the ramp surfaces 26.

Although the device has been described in relation to a flat-link chain, it is possible that it can be applied to any chain or other driving member having a surface suitable for contact and applied pressure by the rollers.

I claim:

1. A drive system for a pair of laterally spaced parallel endless chains mounting between them one or more load carrying members, each of said chains comprising linearly movable flights, said drive system comprising means movable parallel to the chains in a reciprocating manner, reciprocating drive means for said movable means, and said movable means including one or more slippers adapted to grip at least one chain flight and thus drive at least one of the chains in one direction of movement of said movable means and to permit free movement of the latter relative to the chains in the opposite direction, and means operatively associated with a chain flight for preventing reverse movement of the chains and being of similar construction to said movable means but being fixed, such that at least one of the chain flights may move therethrough in the driven direction but be prevented from movement in the opposite direction, whereby said chains may be advanced intermittently in one direction said one or more slippers being movable on one or more rollers attached thereto and adapted to run along a fixed rail or rails.

2. A drive system according to claim 1, in which each said endless chain comprises a series of single flat-links which alternate with a series of pairs of parallel flat-links, the links being pivotally interconnected end-to-end.

3. A drive system according to claim 1, wherein said movable means slipper is arranged to ride over said at least one chain flight in the non-driving direction of its reciprocating movement and having one or more rollers and co-operating ramp surfaces so arranged that in the driving direction the or each roller becomes locked between its co-operating ramp surface and the chain, whereby the slipper and the chain become locked and move together, and in the reverse movement of the slipper the rollers are freed from driving contact with the chain to permit free relative movement of the slipper and chain.

4. A drive system according to claim 1, wherein the drive means comprises a linear thrust unit for effecting reciprocating movement of the movable means.

5. A drive system according to claim 1, wherein said chains are arranged side-by-side and pass freely over upper support means and carry between them a series of open buckets thus to form a bucket elevator, there being a reciprocating slipper arranged to ride over each chain in a non-driving direction of its reciprocating movement and to become locked relative thereto thus to drive same in the opposite direction, there being means for preventing reverse movement of each chain, and at least one linear thrust unit connected to the slippers for effecting reciprocating movement thereof thus to cause said chains to be advanced intermittently in one direction.

6. A drive system for a pair of laterally spaced parallel endless chains mounting between them one or more load carrying members, each of said chains comprising linearly movable flights, said drive system comprising means movable parallel to the chains in a reciprocating manner, reciprocating drive means for said movable means, and said movable means including one or more members adapted to grip at least one chain flight and thus drive at least one of the chains in one direction of movement of said movable means and to permit free movement of the latter relative to the chains in the opposite direction, and means operatively associated with a chain flight for preventing reverse movement of the chains, whereby said chains may be advanced intermittently in one direction, said movable means comprising a slipper arranged to ride over said at least one chain flight in the non-driving direction of its reciprocating movement and having one or more rollers and co-operating ramp surfaces so arranged that in the driving direction the or each roller becomes locked between its co-operating ramp surface and the chain, whereby the slipper and the chain become locked and move together, and in the reverse movement of the slipper the rollers are freed from driving contact with the chain to permit free relative movement of the slipper and chain, said slipper being movable on one or more rollers attached thereto and adapted to run along a fixed rail or rails.

7. A drive system for a pair of laterally spaced parallel endless chains mounting between them one or more load carrying members, each of said chains comprising linearly movable flights, said drive system comprising means movable parallel to the chains in a reciprocating manner, reciprocating drive means for said movable means, and said movable means including a pair of slippers adapted to grip said chains and thus drive the chains in one direction of movement of said movable means and to permit free movement of the latter relative to the chains in the opposite direction, and means operatively associated with a chain flight for preventing reverse movement of the chains, said reciprocating drive means being arranged to cause the slippers to be driven in opposite directions one to the other whereby each slipper advances the chains in one direction of its reciprocating movement whereby the chains are continuously driven alternately by the two slippers.

* * * * *